Figures 1, 2:
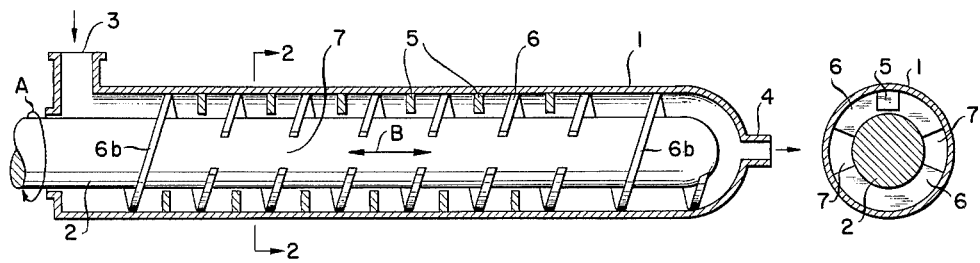

Dec. 21, 1965 G. SCHUUR 3,224,739

MIXING AND KNEADING MACHINE

Filed Sept. 5, 1963

PRIOR ART        PRIOR ART

INVENTOR:
GERRIT SCHUUR
BY: Oswald H. Milmore
HIS ATTORNEY

United States Patent Office 3,224,739
Patented Dec. 21, 1965

3,224,739
MIXING AND KNEADING MACHINE
Gerrit Schuur, Delft, Netherlands, assignor to Shell Oil Company, New York, N.Y., a corporation of Delaware
Filed Sept. 5, 1963, Ser. No. 306,935
Claims priority, application Netherlands, Sept. 26, 1962, 283,627
4 Claims. (Cl. 259—4)

The invention relates to a mixing and kneading machine of the type which comprises a casing provided with inlet and outlet ports and housing a worm screw which is both rotatable and axially reciprocable relative to the casing, the inner walls of the casing being provided with projections which, during the operation of the machine (including the said rotating and reciprocating movements of the worm screw), can pass through the worm of the worm screw via passages or interruptions therein.

In such known machines the mixing and kneading action is based to a considerable extent on the coaction of the projections in the casing with the worm screw during the reciprocating movement of this latter. However, the worm screw, in performing this reciprocating movement within the casing, acts to a certain extent like a piston, with the result that the material worked up by the machine is discharged pulsatingly through the outlet port.

Such an irregular outflow has its drawbacks, for example, because this will cause a cutting device arranged beyond the machine and operating in a regular manner to cut the material being discharged through the outlet port of the machine into pieces of unequal lengths.

In some cases a separate screw extruder is placed between the mixing and kneading machine and the cutter, the extruder wholly or partly damping the fluctuations in the transport of the material. However, such an extruder, if not already necessary for other purposes, is to expensive to be used as damping means.

The object of the invention is to provide a mixing and kneading machine of the said type which immediately discharges the material treated by the machine at a uniform flow rate.

The machine according to the invention is characterized in that the interrupted worm comprises a section wherein the worm threads are wound in a screw direction contrary to the direction of the worm threads in another section of this worm, so that during the said operation of the machine the material supplied to it for treatment forms two streams of material flowing in opposite directions through the casing, a common outlet port being provided in the machine for both of said streams. In this machine, an increased supply of material by one of the two said streams to the common outlet port, caused by an axial movement of the worm screw, is compensated by a diminished supply of material by the other stream to the outlet port, and vice versa. The fluctuations in the streams of material in the casing on either side of the common outlet port thus wholly or partly balance each other at this outlet port, so that a constant or substantially constant stream of material is discharged from the machine.

In the usual embodiment of the machine, an inlet port is provided near each of the two ends of the casing, and in operation of the machine the two streams flowing in opposite directions in the casing are directed towards each other. The outlet port is situated at the junction of said two streams. The sections of the worm screw with the worm threads wound in contrary directions need not be equal in length; however, the said sections of the worm screw will generally be symmetrical relative to the common outlet port in the machine. The resultant axial force working on the worm screw exclusively as a consequence of the static pressure generated in the casing by rotation of the worm screw, is equal to zero. Hence an axial force is only required for reciprocating the worm screw in order to overcome the resistance exerted by the material. For this reason axial thrust bearings for the worm screw may be of a lighter construction than in the known machine, or may be omitted.

Moreover, an important advantage is that the mechanism effecting the reciprocating movement is considerably less loaded because the mechanism does not have to act against the resultant static pressure in the casing, as it is required to do in the known machines. This favorable loading of the reciprocating mechanism creates the possibility of allowing higher pressures in the casing in order to improve the kneading and mixing performance of the machine or for mixing and kneading materials which require a higher mixing or kneading pressure than it has so far been possible to achieve using such machines.

Figure 3:
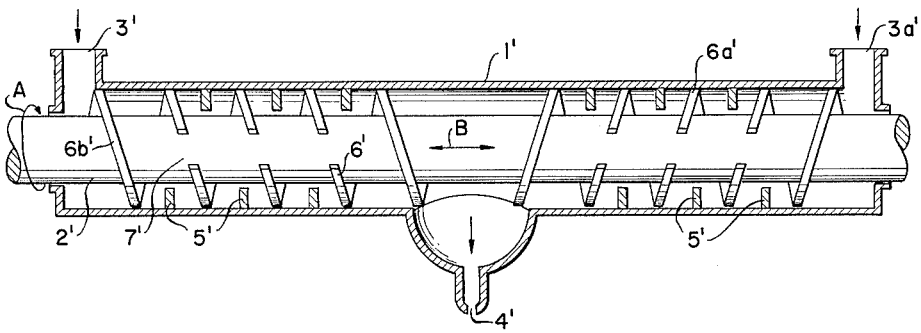

The invention will now be illustrated with reference to the accompanying drawings forming a part of this specification and showing a preferred embodiment wherein:

FIGURE 1 is a longitudinal section through a known kneading and mixing machine of the type to which the invention is directed, FIGURE 2 is a cross section on the line 2—2 of FIGURE 1, and FIGURE 3 is a longitudinal section of a kneading and mixing machine according to the invention.

In the drawings like or corresponding parts are indicated by the same reference numbers, one prime, however, being added in FIGURE 3.

The kneading and mixing machines represented comprise a casing 1, containing a worm screw 2 and provided with one or more inlet ports 3 and an outlet port 4. On the inner wall of the casing 1 a plurality of small, flat projections 5 is mounted, e.g., in staggered arrangement at uniform longitudinal intervals. The worm screw 2 is both rotatable and axially reciprocable relative to the casing as indicated by arrows A and B. The worm screw carries a helical worm 6 which has a pitch distance corresponding to the intervals between the projections 5. Opposite each projection 5 in the casing 1, the worm 6 is provided with passages or interruptions 7 are such that during the operation of the machine, in which the worm screw 2 simultaneously rotates progressively and reciprocates in an axial direction, the projections 5 can pass through the interruptions 7 unhindered. Near the inlet port(s) 3 and the outlet port 4, the worm 6b is uninterrupted for the building up of the necessary kneading pressure in the machine and for the generation of the required extrusion pressure respectively. In the known embodiment, just described all the threads of the worm screw 2 are wound in the same direction.

The mixing and kneading machine according to the invention, an embodiment of which is shown in FIGURE 3, differs from the known machine in that the threads 6a' of one section of the worm screw 2' are wound in the direction contrary to that of the threads 6' in the remaining section of the worm screw 2'. The casing 1' of this latter machine is provided with two inlet ports 3' and 3a', one near each end of the casing; the outlet port 4' is situated in the middle of the casing 1' between the two sections of the worm screw 2' having their threads wound in contrary directions.

In operation of the mixing and kneading machine according to FIGURES 1 and 2 the material to be treated by the machine is supplied through the inlet port(s) 3 to the casing 1 and conveyed by the rotating worm screw 2 to the outlet port 4. The material, while passing through the section of the casing 1 where the projections 5 are situated, is subjected to intensive mixing, for the most part by the kneading action of the projections 5 during the reciprocating movement of the worm screw 2. As a result of this reciprocating movement of the worm screw 2, the material is discharged pulsatingly through the outlet port 4.

In the construction according to the invention, i.e., FIGURE 3, the material is charged to both inlet ports 3' and 3a'. Axial accelerations and retardations in the material within the casing 1' also occur on each side of the outlet port 4'. An increased supply of material to the outlet port 4' from the one side thereof is now, however, compensated by an equally large reduction in the supply of material to the outlet port 4' from the other side thereof, and vice versa. Consequently the fluctuations produced in the material within the casing 1' do not continue outside this casing, and a constant stream of material flows out of the outlet port 4'.

The invention also covers embodiments which constitute a kinematic inversion of the machine described. Thus, for example, the axial reciprocating movement can be effected by the casing 1' instead of by the worm screw 2'. It is also possible, in principle, to design the machine with a common inlet port arranged in the middle of the casing between the sections of the worm screw having threads in contrary directions, and with separate outlet ports, arranged at the ends of the casing, with discharge lines issuing in a common outlet port. This embodiment is, however, less attractive than the embodiment shown in FIGURE 3, not least among the difficulties being the problem of obtaining a satisfactory sealing between the worm screw and the casing.

I claim as my invention:

1. A mixing and kneading machine which comprises:
   (a) a casing provided with at least three ports which include inlet and outlet ports and having a plurality of longitudinally spaced projections extending inwards,
   (b) a worm screw mounted within said casing and being both rotatable and axially reciprocable relative to the casing, said screw having a worm which is interrupted at longitudinal intervals spaced apart by distances equal to the longitudinal intervals between said projections to form passages, whereby said projections can pass through said passages during said rotary and axial reciprocatory movements of the screw, and
   (c) said worm being wound in one screw direction between one pair of different ports and in the other screw direction between another pair of different ports, whereby, during the operation of the machine, material supplied to the inlet port or ports flows in opposite directions within the casing.

2. A mixing and kneading machine as defined in claim 1 wherein said worm is symmetrical with respect to the center of the worm screw.

3. A mixing and kneading machine as defined in claim 1 which has two inlet ports situated respectively at the ends of the casing and a common outlet port in communication with the part of the casing intermediate said ends, whereby portions of material supplied to said two inlet ports flow in opposite directions through the casing toward each other.

4. A mixing and kneading machine as defined in claim 3 wherein said worm is symmetrical with respect to the said common outlet port.

References Cited by the Examiner

UNITED STATES PATENTS

| | | | |
|---|---|---|---|
| 696,282 | 3/1902 | Upton | 259—97 X |
| 2,731,247 | 1/1956 | Hudry | 259—97 X |

WALTER A. SCHEEL, *Primary Examiner.*